Patented Apr. 22, 1924.

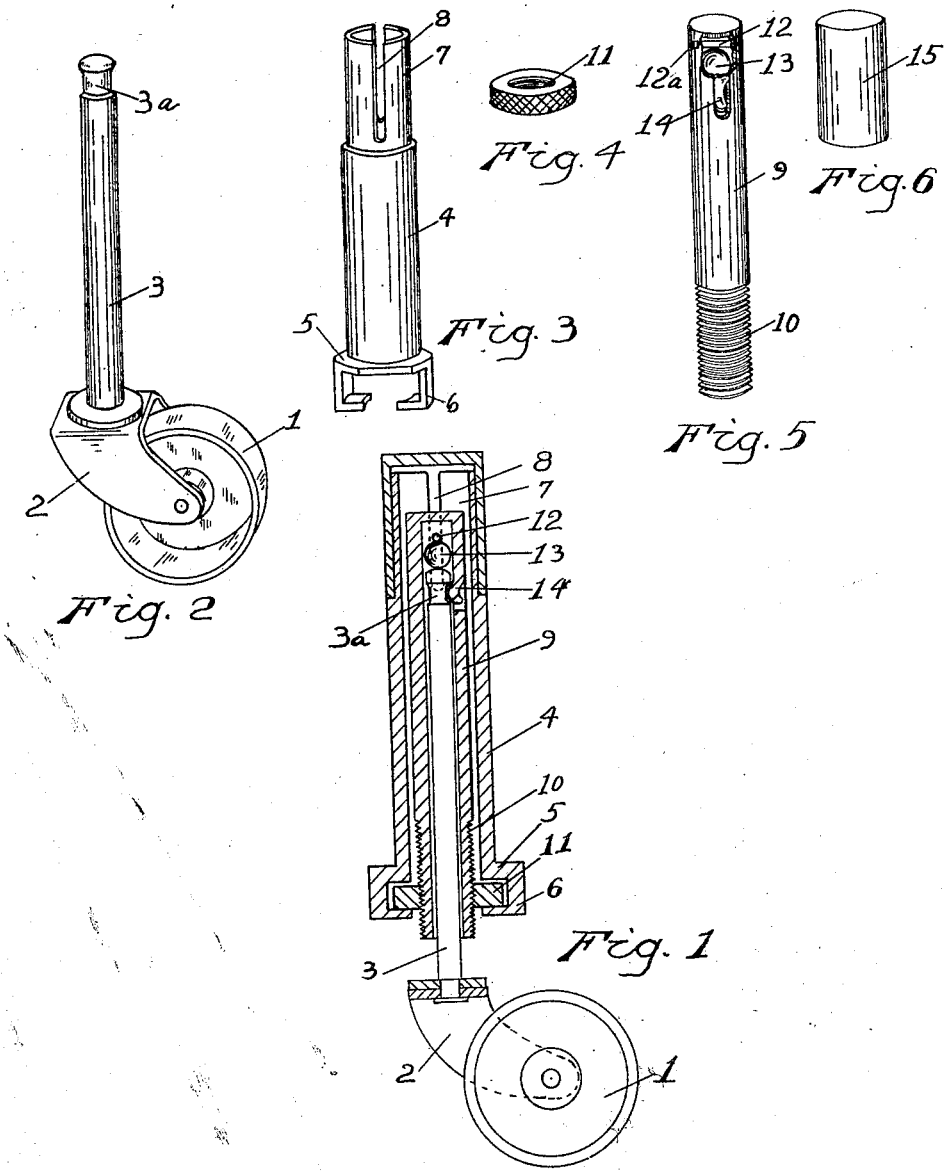

1,491,204

UNITED STATES PATENT OFFICE.

CARL A. EPTING, OF SAGINAW, MICHIGAN.

CASTER.

Application filed March 3, 1923. Serial No. 622,523.

*To all whom it may concern:*

Be it known that I, CARL A. EPTING, a citizen of the United States, residing at Saginaw, in the county of Saginaw and State of Michigan, have invented certain new and useful Improvements in Casters; and I do hereby declare the following to be a full, clear, and exact description of the invention, such as will enable others skilled in the art to which it appertains to make and use the same.

This invention relates to furniture casters and more particularly to an improved construction and arrangement of parts of the pintle device whereby the objects of my invention are attained.

These objects are, first, to provide a caster having means for quickly and easily adjusting its height A further object is to provide a vertically adjusting device having means for maintaining such adjustment and avoiding liability of disturbing the adjustment when the caster is revolved as in moving the piece of furniture to which it is applied.

A further object is to provide a simple and strong, yet relatively inexpensive caster adjustable as to height and adapted by its construction to operate quietly and with a minimum of friction.

With the foregoing and certain other objects in view which will appear later in the specifications my invention comprises the devices described and claimed and the equivalents thereof.

In the drawings, Fig. 1 is a part vertical section through a caster embodying my improvement, the thickness of the walls being exaggerated in the drawing for the sake of clearness.

Fig. 2 is a side view of the roller, bracket and pintle.

Fig. 3 is a side view of the outer tubular casing.

Fig. 4 is a perspective view of the adjusting nut.

Fig. 5 is a side view partly broken away, showing the intermediate tubular jacket.

Fig. 6 is a perspective view of the tubular cap for the upper end of the casing shown in Fig. 3.

As is clearly shown in the drawings, the assembled caster comprises the usual roller 1 mounted in a suitable bracket 2 having an upwardly projecting pintle 3.

The outer tubular casing 4 has upon its lower end a flange 5 provided with a pair of downwardly and inwardly projecting lugs 6 adapted to receive a threaded adjusting nut which will be described presently.

The upper end of tubular casing 4 is preferably reduced in external diameter, as at 7, and the reduced part is formed with longitudinal slots 8, as shown in Figs. 1 and 3. An intermediate tubular jacket 9 is vertically adjustable within the tubular casing 4 and has its lower end threaded as at 10. The threaded end of intermediate jacket 9 is screwed into a nut 11 loosely received between the downwardly and inwardly projecting lugs 6, so that the turning of nut 11 will longitudinally adjust intermediate jacket 9. A hardened steel pin 12 or its equivalent is inserted diametrically across the upper part of intermediate jacket 9, the ends 12$^a$ of the pin projecting slightly outside the jacket, so as to be received in the longitudinal slots 8 of casing 4, thereby permitting the lengthwise adjustment of the jacket 9 while preventing its turning with respect to the outer tubular casing 4. Between the upper end of the pintle and the steel pin 12 is placed a steel ball 13 to serve as a bearing. The ball is loosely held in place when pintle 3 is withdrawn, by means of an inwardly projecting spring 14 formed in the cylindrical wall of jacket 9, and the same spring lip engages an annular groove 3$^a$ formed near the upper end of the pintle 3 when the pintle is in place. As a closure for the upper reduced end of casing 4 I provide a removable cap 15. The intermediate jacket 9 is locked by pin 12 against turning with relation to the outer tubular casing 4, so that even though the pintle 3 be rotated the threaded end and nut 11 will maintain their adjusted positions.

Having thus described my invention, what I claim and desire to secure by Letters Patent is:

1. In a caster having a roller and a pintle, an outer tubular casing formed with a longitudinal slot in one end and lugs at its other end, a threaded nut revolvably received between said lugs, an intermediate tubular jacket longitudinally adjustable within said casing, said jacket threaded at its lower end into said nut, a transverse pin extending through said jacket near its upper end, the ends of said pin projecting beyond the surface of said jacket and slidingly received in the slot of said casing, a pintle ball loosely received in said intermediate jacket beneath said pin, and a spring adapted to retain said ball.

2. In a caster having a roller and a pintle, an outer tubular casing formed with a longitudinal slot in one end and lugs at its other end, a threaded nut revolvably received between said lugs, an intermediate tubular jacket longitudinally adjustable within said casing, said jacket threaded at its lower end into said nut, and a transverse pin extending through said jacket near its upper end, an end of said pin projecting beyond the surface of said jacket and slidingly engaging the slot of said casing.

In testimony whereof, I affix my signature.

CARL A. EPTING.